United States Patent [19]

Mitchell et al.

[11] 3,862,940
[45] Jan. 28, 1975

[54] PREPARATION OF CARBOXYLATE AND SULFONATE SALTS OF 1-CIS-(3-CHLORO-2-PROPENYL)-3,5,7-TRIAZA-1-AZONIATRI CYCLO(3.3.1.1 3,7)DECANE

[75] Inventors: Albertha B. Mitchell, Waltham, Mass.; Charles E. Moppett, Waterford, Conn.; Thomas P. Brady, Natick, Mass.

[73] Assignee: The Dow Chemical Company, Midland, Mich.

[22] Filed: Oct. 24, 1973

[21] Appl. No.: 409,340

[52] U.S. Cl. .......................... 260/248 NS, 424/249
[51] Int. Cl. ............................................. C07d 55/14
[58] Field of Search .............................. 260/248 NS

[56] References Cited
UNITED STATES PATENTS
3,228,829  1/1966  Wolf et al. .................. 26/248 X

*Primary Examiner*—John M. Ford
*Attorney, Agent, or Firm*—Theodore Post; C. Kenneth Bjork

[57] ABSTRACT

Compounds of the formulas

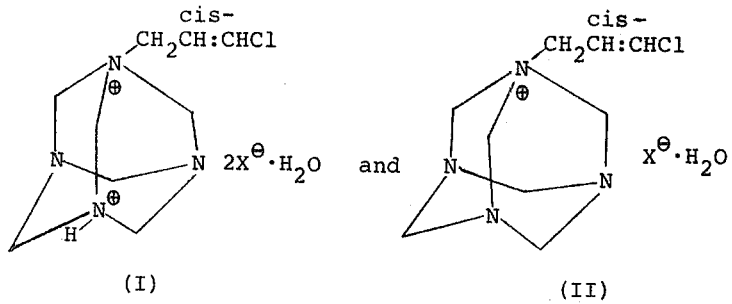

wherein X⁻ is a lower alkyl carboxylate (I), a phenylcarboxylate (I), a lower alkylsulfonate (II) or a phenylsulfonate (II) anion, wherein the phenyl ring may have lower alkyl, lower alkoxy, hydroxyl, amino, nitro, bromo or chloro substitution. The compounds are prepared by reacting the carbinolamine, prepared by reacting cis-1-(3-chloro-2-propenyl)-3,5,7-triaza-1-azoniatricyclo(3.3.1.1³,⁷)decane chloride with aqueous sodium hydroxide, with a carboxlyic or sulfonic acid, as indicated, to form the corresponding 1-cis-(3-chloro-2-propenyl)-3,5,7-triaza-1-azoniatricyclo-(3.3.1.1³,⁷)decane carboxylate or sulfonate. These compounds have antimicrobial activity.

14 Claims, No Drawings

PREPARATION OF CARBOXYLATE AND SULFONATE SALTS OF 1-CIS-(3-CHLORO-2-PROPENYL)-3,5,7-TRIAZA-1-AZONIATRI CYCLO(3.3.1.13,7)DECANE

BACKGROUND OF THE INVENTION

The compound cis-1-(3-chloro-2-propenyl)-3,5,7-triaza-1-azoniatricyclo(3.3.1.1$^{3,7}$)decane chloride, known commercially as Dowicil 200 antimicrobial, is described in U.S. Pat. No. 3,228,829. Dowicil 200 antimicrobial possesses inherent instability problems. Also, various salts of the N-methyl analog of Dowicil 200 are known, i.e., the nitrate, chlorate, sulfate, rhodanide, meta-borate, bichromate, perchlorate, ferrocyanate and picrate; U.S. Pat. No. 1,336,709. No utility is claimed for these latter compounds, however.

SUMMARY OF THE INVENTION

This invention concerns mono- and di-salts corresponding to the formulas

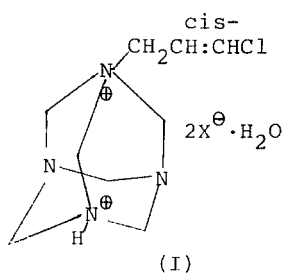 and 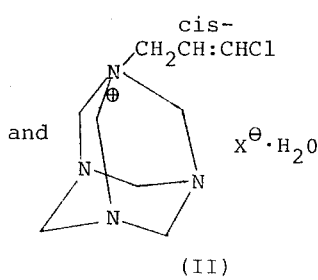

(I)    (II)

wherein X represents a lower alkyl carboxylate (I), a phenylcarboxylate (I) a lower alkyl sulfonate (II) or a phenylsulfonate (II) anion wherein the phenyl ring may have lower alkyl, lower alkoxy, hydroxyl, amino, nitro, bromo or chloro substitution, hereinafter designated "a phenyl" or "a benzene". In the specification and claims, "lower alkyl" and "lower alkoxy" designate a 1 to 4 carbon atom alkyl or alkoxy group, respectively.

The compounds are prepared by reacting Dowicil 200 brand of cis-1-(3-chloro-2-propenyl)-3,5,7-triaza-1-azoniatricyclo(3.3.1.1$^{3,7}$)decane chloride, sometimes also referred to herein as "Cis," with excess aqueous sodium hydroxide at room temperature to give the carbinolamine, 7-cis-(3-chloro-2-propenyl)-1,3,5,7-tetraazabicyclo(3.3.1)-nonane-3-methanol, hereinafter referred to as "Carbinolamine," according to the following reaction scheme:

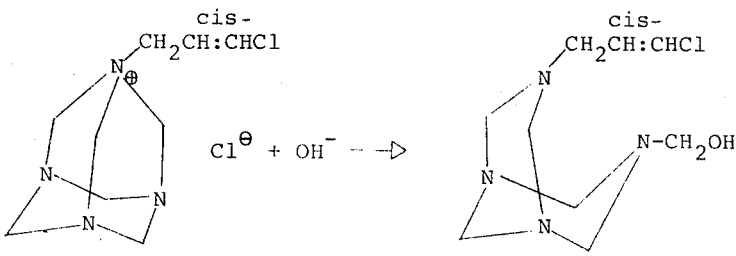

The Carbinolamine is recovered from the reaction medium by extraction with an inert neutral organic solvent such as ether or benzene, the extract is dried over sodium sulfate and the solvent is evaporated to give the Carbinolamine as a viscous oil.

The mono- and di-salts of the Carbinolamine are prepared by adding substantially one molar proportion of the sulfonic acid or two molar proportions of the carboxylic acid, respectively, in solution in an inert, neutral organic solvent, e.g., acetone, ether or benzene, to substantially one molar proportion of the Carbinolamine dissolved in a similar inert, neutral organic solvent. Upon stirring the reaction mixture at room temperature, a copious white precipitate forms which is easily isolated by filtration. It is dried to yield a pure white mono- or di-salt. The structure is confirmed by elemental analysis and by N.M.R.

The following procedures and examples further describe the invention and the manner and process of making and using it so as to enable the art skilled to make and use the invention, and set forth the best mode contemplated by the inventors of carrying out the invention.

EXAMPLE 1

Preparation of the Di-benzoate Salt of Cis

A quantity of 80 g. (2.0 mole) NaOH was dissolved in 500 ml. H$_2$O and cooled to room temperature. 100 Grams (0.4 mole) of Cis was added slowly to the caustic solution and the reaction mixture was stirred 15 minutes at ambient temperature. Product Carbinolamine was extracted with benzene, dried over Na$_2$SO$_4$ and the benzene evaporated to give 72 g. (78% yield) of a viscous oil, the Carbinolamine.

10.0 Grams (0.043 mole) Carbinolamine was dissolved in 50 ml. of ether, then filtered through Celite to give a clear, amber solution. 10.62 Grams (0.087 mole) benzoic acid in 100 ml. ether was added to the Carbinolamine solution at room temperature with stirring. In seconds, a copious white precipitate formed which was easily isolated by filtration, followed by drying to yield 18.0 g. (92% yield) of pure white Cis dibenzoate, m.p. 70°–72°C. Elemental analysis and N.M.R. indicated the bis-salt had been prepared.

EXAMPLE 2

Preparation of the p-Toluene Sulfonate Mono-Salt of Cis

A quantity of 5.28 g. (0.021 mole) Carbinolamine was dissolved in 50 ml. cold ether, then filtered through Celite to give a clear solution. 4.08 Grams (0.021 mole) p-toluene sulfonic acid was dissolved in 100 ml. ether, then added to the cold Carbinolamine solution (0°C.). A white crystalline precipitate formed immediately. After filtration and drying, the yield was 4 g. (ca. 50%), m.p. 125.5°–127°C. N.M.R. and elemental analysis indicated the titular product was prepared.

EXAMPLE 3

The following compounds Ia-Ii and IIa were prepared by substituting the corresponding carboxylic or sulfonic acid in the procedure of Example 1 or Example 2 to obtain the indicated di- or mono-salt, respectively.

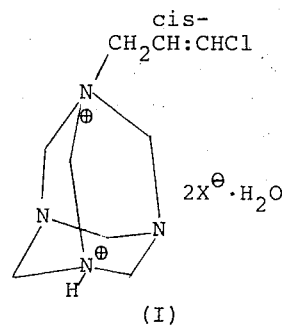

(I)

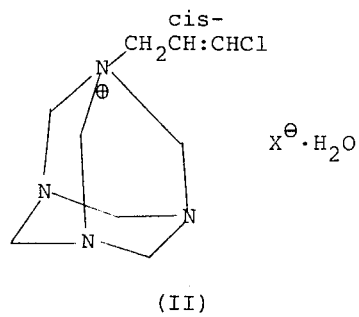

(II)

|     | X | m.p. °C. |
| --- | --- | --- |
| Ia. | ortho—$HOC_6H_4COO$ | 95–97 |
| Ib. | Para—$HOC_6H_4COO$ | 65–67 |
| Ic. | para—$CH_3C_6H_4COO$ | 87–89 |
| Id. | ortho—$NH_2C_6H_4COO$ | 66–67 |
| Ie. | ortho—$NO_2C_6H_4COO$ | 97–99 |
| If. | para—$ClC_6H_4COO$ | 96–96.5 |
| Ig. | $2,4—Cl_2C_6H_3COO$ | 98–100 |
| Ih. | $o—BrC_6H_4COO$ | 40 |
| Ii. | $CH_3COO$ | 25 |
| IIa. | $CH_3SO_3$ | 120–121 |

The Compounds of the invention are useful as antimicrobials for the control of bacteria and fungi. This is not to suggest that the Compounds and their mixtures are equally effective against all such organisms at the same concentration. For such uses the Compounds or their mixtures can be employed in an unmodified form or dispersed on a finely divided solid and employed as dusts. Such mixtures can also be dispersed in water with the aid of a surface-active agent and the resulting emulsions employed as sprays. In other procedures, the products can be employed as active constituents in solvent solutions, oil-in-water or water-in-oil emulsions, including cosmetic emulsions. The augmented compositions are adapted to be formulated as concentrates and subsequently diluted with additional liquid or solid adjuvant to produce the ultimate treating compositions. Good results are obtained when employing compositions containing antimicrobial concentrations from about 100 to about 1,000 parts by weight of one or more of the compounds per million parts of such compositions.

Incorporation of the compounds of this invention into materials which are subject to bacterial and/or fungal attach inhibits the growth of such microbes and preserves the original value of the materials. The compounds are sufficiently nonvolatile and water-insoluble that they will persist on or in such materials for long periods of time. Examples of materials which are adversely effected by fungal growth are latex and alkyd paint films, wood and wooden products. The inventive compounds are sufficiently active against fungi that only small quantities are required to prevent mildew on paint films or wood rot. The compounds are therefore useful for long-term protection against fungal growth in or on materials having a wood basis or a protective or decorative paint film subject to fungal attack.

In representative operations, the products of the invention when tested for antimicrobial activity using conventional agar dilution tests gave complete growth inhibition against the following organisms at the indicated concentrations in parts per million:

| Minimum Inhibitory Concentration, ppm | | | | | | | |
| --- | --- | --- | --- | --- | --- | --- | --- |
| Compound of Example | Sa | St | Aa | Pa | Cp | Sc | An | Pen |
| 1 | 100 | 50 | 100 | 250 | >500 | >500 | >500 | 500 |
| 2 | 250 | 50 | 100 | 250 | ± | ± | >500 | 500 |
| I a | 100 | 50 | 100 | 250 | ± | ± | >500 | 500 |
| I b | 75 | 50 | 75 | 250 | ∓ | ± | >500 | 500 |
| I c | 100 | 100 | 100 | 250 | ± | 500 | >500 | 500 |
| I d | 250 | 50 | 250 | 250 | ∓ | 500 | >500 | 500 |
| I e | 75 | 25 | 250 | 250 | >500 | >500 | >500 | >500 |
| I f | 250 | 75 | 250 | 250 | 500 | 500 | 250 | 100 |
| I g | 50 | 50 | 250 | 250 | >500 | >500 | >500 | ∓ |
| I h | 250 | 75 | 250 | 250 | >500 | >500 | >500 | >500 |
| I i | 250 | 50 | 250 | 250 | 250 | 500 | 500 | 100 |

— Continued

| Compound of Example | Sa | St | Aa | Pa | Cp | Sc | An | Pen |
|---|---|---|---|---|---|---|---|---|
| IIa | 250 | 75 | 75 | 250 | 500 | 500 | 500 | 250 |
| Cis* | 50 | 25 | 50 | 100 | ± | 500 | >500 | 250 |

*Dowicil 200 antimicrobial
Sa = *S. aureus*
St = *S. typhosa*
Aa = *A. aerogenes*
Pa = *P. aeruginosa*
Cp = *C. pelliculosa*
Sc = *S. cerevisiae*
An = *A. niger*
Pen = *P. chrysogenum*
± = 50% inhibition at 500 ppm
∓ = ≥90% inhibition at 500 ppm

What is claimed is:

1. A compound corresponding to one of the formulas (I) and (II) [structural formulas shown]

wherein X represents a lower alkyl carboxylate (I), a lower alkyl sulfonate (II), a benzoate (I) or a phenylsulfonate (II) salt wherein the phenyl group may contain lower alkyl, lower alkoxy, hydroxyl, amino, nitro, chloro or bromo substitution.

2. The compound of claim 1 represented by formula (I) wherein $X^{\ominus}$ represents the benzoate anion.

3. The compound of claim 1 represented by formula (II) wherein $X^{\ominus}$ represents the p-toluene sulfonate anion.

4. The compound of claim 1 represented by formula (I) wherein $X^{\ominus}$ represents the o-hydroxy benzoate anion.

5. The compound of claim 1 represented by formula (I) wherein $X^{\ominus}$ represents the p-hydroxybenzoate anion.

6. The compound of claim 1 represented by formula (I) wherein $X^{\ominus}$ represents the p-methylbenzoate anion.

7. The compound of claim 1 represented by formula (I) wherein $X^{\ominus}$ represents the o-aminobenzoate anion.

8. The compound of claim 1 represented by formula (I) wherein $X^{\ominus}$ represents the o-nitrobenzoate anion.

9. The compound of claim 1 represented by formula (I) wherein X represents the p-chlorobenzoate anion.

10. The compound of claim 1 represented by formula (I) wherein $X^{\ominus}$ represents the 2,4-dichlorobenzoate anion.

11. The compound of claim 1 represented by formula (I) wherein $X^{\ominus}$ represents the o-bromobenzoate anion.

12. The compound of claim 1 represented by formula (I) wherein $X^{\ominus}$ represents the acetate anion.

13. The compound of claim 1 represented by formula (II) wherein $X^{\ominus}$ represents the methyl sulfonate anion.

14. Method for making a carboxylate or a sulfonate salt of cis-1-(3-chloro-2-propenyl)-3,5,7-triaza-1-azoniatricyclo-[3.3.1.1$^{3,7}$]decane which comprises adding to an inert, neutral organic solvent solution of 7-cis-(3-chloro-2-propenyl)-1,3,5,7-tetraazabicyclo-(3.3.1)-nonane-3-methanol at a temperature between about 0°C. and room temperature (a) substantially two molar proportions of a lower alkyl carboxylic acid, or a benzoic acid having lower alkyl, lower alkoxy, hydroxyl, amino, nitro, chloro or bromo substitution, or (b) substantially one molar proprotion of a lower alkyl sulfonic acid or a benzene sulfonic acid, respectively, in an inert, neutral organic solvent and recovering the said product from the reaction medium.

* * * * *

PO-1050
(5/69)

UNITED STATES PATENT OFFICE
CERTIFICATE OF CORRECTION

Patent No. 3,862,940         Dated January 28, 1975

Inventor(s) Albertha B. Mitchell, Charles E. Moppett and Thomas P. Brady

It is certified that error appears in the above-identified patent and that said Letters Patent are hereby corrected as shown below:

In the Abstract, first line following the formulas, after the "X" insert the omitted ⊖.

In the Abstract, fifth line from the bottom, the word "carboxlyic" should read -- carboxylic --.

Column 1, line 33, after the "X" insert the omitted ⊖.

Column 4, line 19, the word "attach" should read "attack".

Column 4, in the table, compound of Example 1a, under "Pen", the symbol > should be inserted before the 500.

Column 6, Claim 14, line 57 of the column, the word "proprotion" should read -- proportion --.

Signed and Sealed this twenty-sixth Day of August 1975

[SEAL]

Attest:

RUTH C. MASON
Attesting Officer

C. MARSHALL DANN
Commissioner of Patents and Trademarks